United States Patent

[11] 3,589,301

| [72] | Inventor | Larry L. Reagan |
| | | Wind Gap, Pa. |
| [21] | Appl. No. | 819,592 |
| [22] | Filed | Apr. 28, 1969 |
| [45] | Patented | June 29, 1971 |
| [73] | Assignee | SI Handling Systems, Inc. |
| | | Easton, PA, |

[54] VEHICLE WITH ECCENTRICALLY MOUNTED BUMPER
8 Claims, 4 Drawing Figs.

[52] U.S. Cl. ..................................... 104/170, 104/172
[51] Int. Cl. ........................................ B65g 17/42
[50] Field of Search ........................................... 104/88, 170, 172 BT, 178

[56] References Cited
UNITED STATES PATENTS
| 3,338,181 | 8/1967 | Dorrance | 104/78 |
| 3,503,338 | 3/1970 | Klamp | 104/172 |

Primary Examiner—Arthur L. LaPoint
Assistant Examiner—Robert Saifer
Attorney—Seidel, Gonda and Goldhammer ABSTRACT: A vehicle such as a tow truck is provided with a single bumper capable of effecting accumulation or pushing. The bumper contact surface is arcuate in configuration and preferably is a cylinder eccentrically mounted for rotation about an axis at the three o'clock position within its contour.

PATENTED JUN 29 1971

INVENTOR
LARRY L. REAGAN

BY
Seidel, Gonda & Goldhammer
ATTORNEYS.

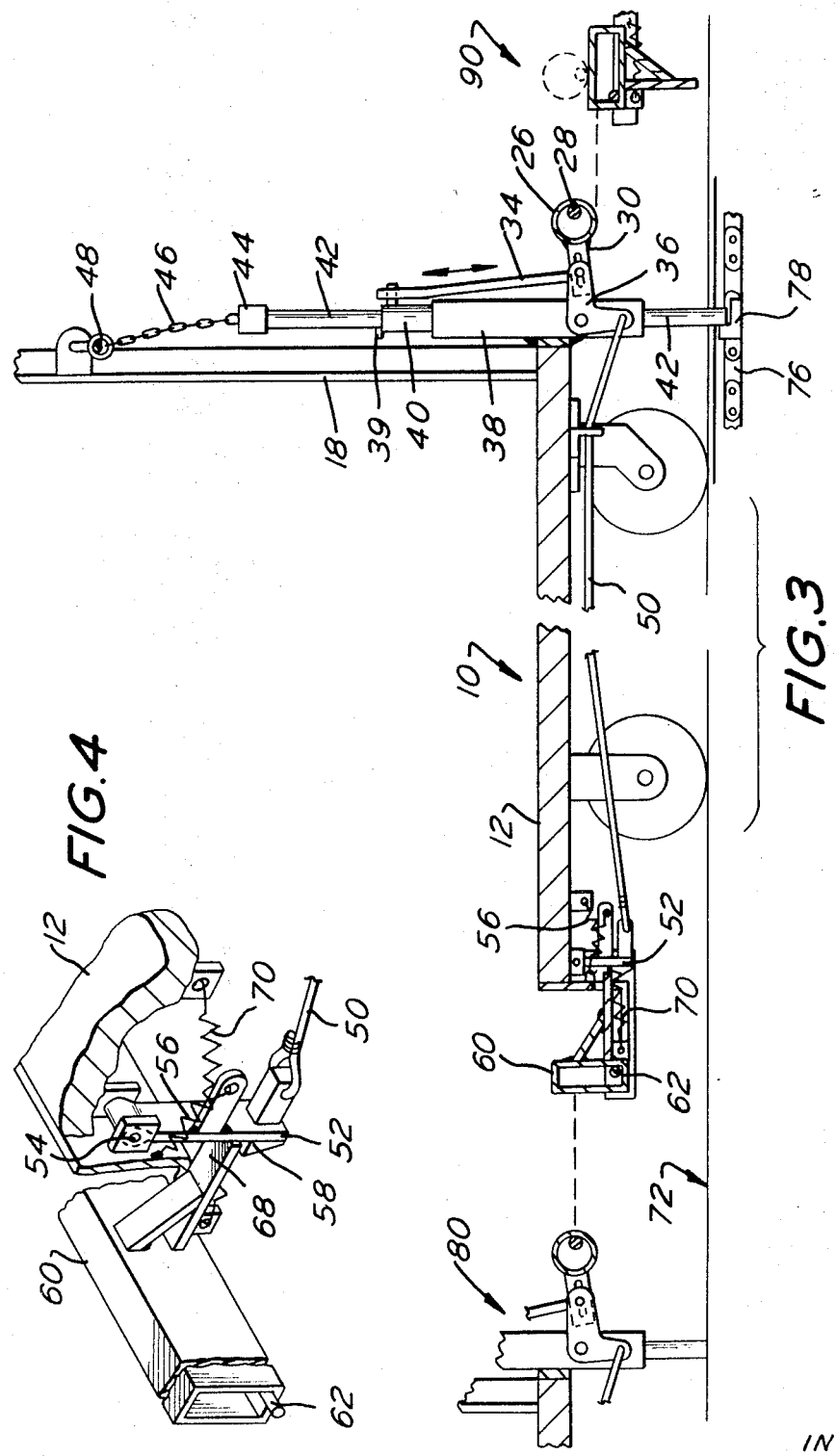

VEHICLE WITH ECCENTRICALLY MOUNTED BUMPER

This invention relates to a vehicle, preferably a tow truck adapted to be moved along a guide slot in a reference surface such as a floor. A large number of such vehicles have been proposed heretofore. For example, see U.S. pat. No 3,103,895.

The vehicle in said patent is provided with a pushing bumper and an accumulation bumper. When the accumulation bumper is activated, it generally causes the tow pin to be raised and rigidifies a rear bumper. When the pushing bumper makes contact with the next vehicle, the next vehicle is pushed due to contact with the pushing bumper.

In accordance with the present invention, a single bumper is provided which can perform the functions of the dual bumpers described above and illustrated in said patent. In accordance with the present invention, the single bumper is preferably provided with an arcuate contour eccentrically mounted about an axis within its contour at approximately the 3 o'clock position. When the bumper contacts a rigid surface on a vehicle in front of it, the front vehicle is pushed due to contact with the bumper. When the single bumper contacts a surface on the vehicle in front of it which offers resistance and pivots out of the way, the arcuate bumper rotates, causes accumulation due to raising the tow pin out of contact with its pushing chain or other drive mechanism, and releases the rear bumper on its vehicle.

It is an object of the present invention to provide a novel tow truck having a single bumper capable of effecting accumulation or pushing.

It is another object of the present invention to provide a tow truck having a simplified bumper system which is reliable.

It is another object of the present invention to provide a tow truck having a cylindrical bumper which will effect a pushing action when contacted at the 3 o'clock position but will cause accumulation when contacted at the 5 o'clock position.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3–3 in FIG. 1.

FIG. 4 is a partial perspective view of the rear bumper construction.

Figure 1:
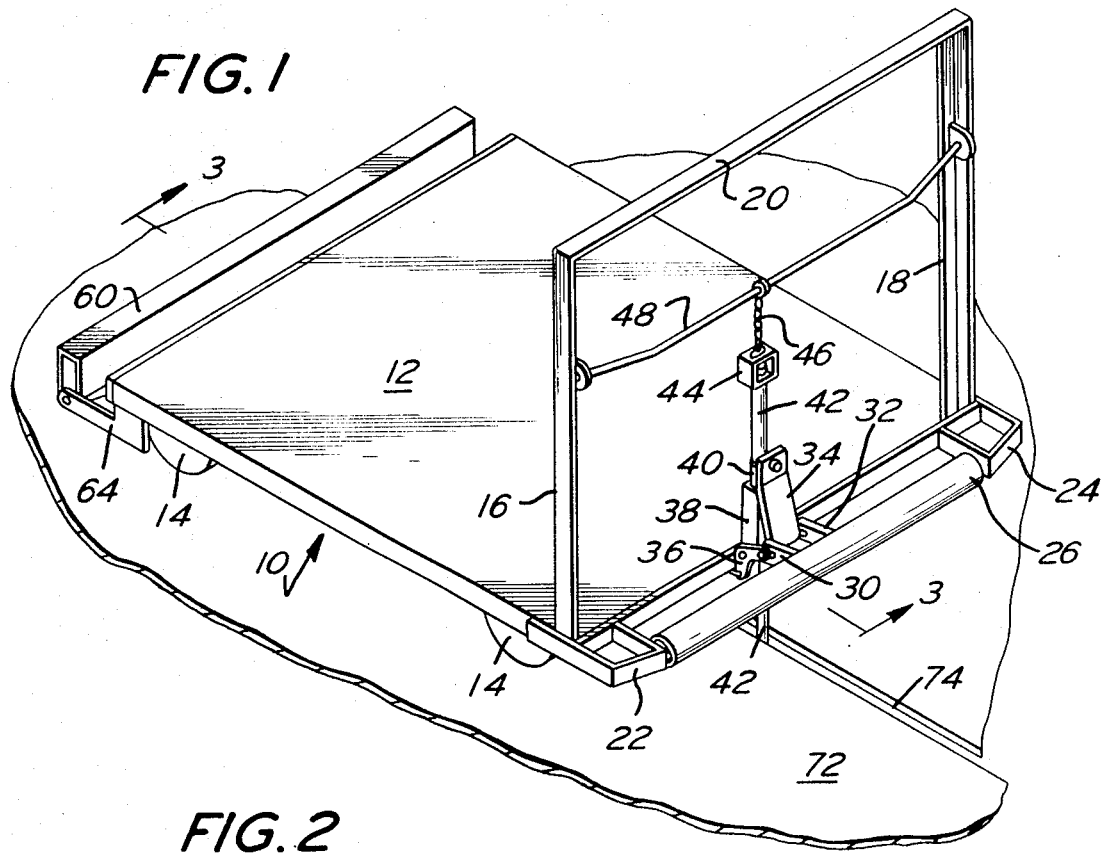
FIG. 1 is a partial perspective view of the tow truck of the present invention.

Referring to the drawing in detail, wherein like numerals indicate like elements, there is shown a tow truck designated generally as 10. The truck 10 includes a flat horizontal base 12 which may be varied to suit the material to be supported thereby. The base 12 is provided with wheels 14.

Figure 2:
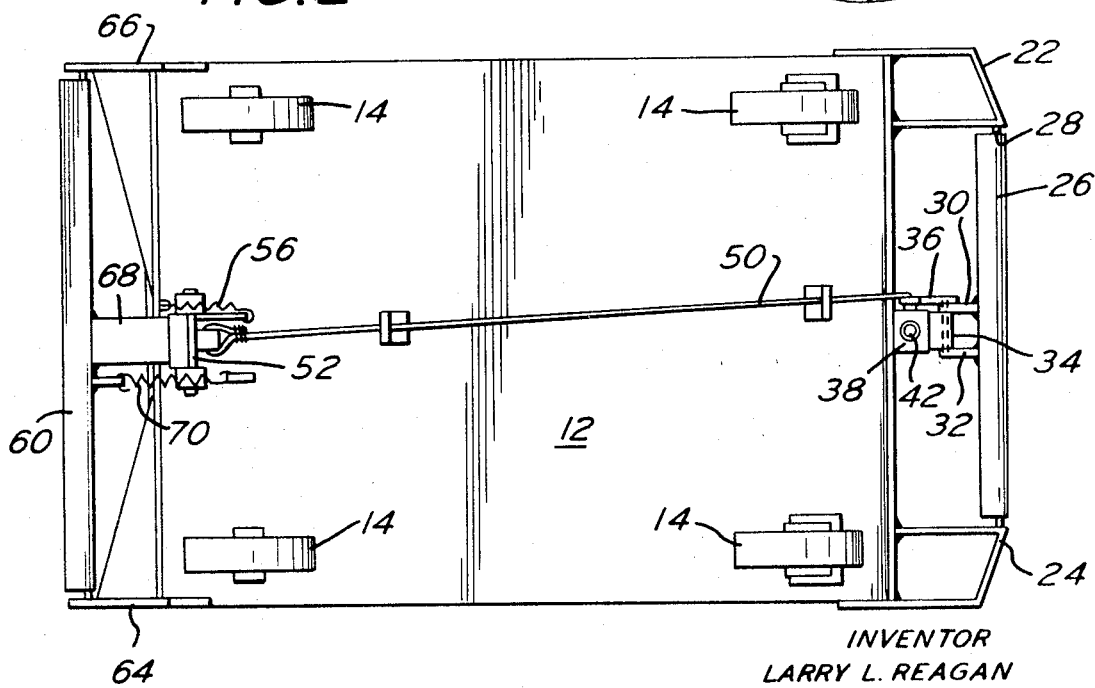
FIG. 2 is a bottom plan view of the truck shown in FIG. 1.

At the front end of the base 12, there is provided vertical members 16 and 18 interconnected at their upper ends by a horizontal member 20. At the front corners of the base 12, bumper supports 22 and 24 project forwardly therefrom. As will be apparent from FIG. 2, the bumper supports 22 and 24 are angled towards the side and rearwardly of the base 12.

A bumper 26 is rotatably supported by the bumper supports 22 and 24. The bumper 26 is preferably a cylinder but may be a curved surface. Cylinder 26 is rotated about the axis of pin 28. Pin 28 is located at the 3 o'clock position of the cylinder 26 within the contour thereof as shown more clearly in FIG. 3. This results in an eccentric mounting for the cylinder 26 so that it may rotate about an axis parallel to its longitudinal axis.

A pair of brackets 30 and 32 extend rearwardly from the central portion of the bumper 26. One end of the brackets 30 and 32 is fixedly secured to the periphery of bumper 26. The free end of the brackets 30 and 32 are pivotably connected to an upright link 34 and to one leg of a bellcrank 36. The bellcrank 36 is pivotably connected to a stationary vertically disposed support structure 38 located at the front end of the base 12 intermediate the sides thereof.

A vertically disposed tow pin 42 extends through the support structure 38 and is slidably supported thereby. A sleeve 40 surrounds tow pin 42 above the support structure 38. The upper end of link 34 is secured to the sleeve 40. Sleeve 40 can slide with respect to the tow pin 42. A pin or limit stop 39 extends from the tow pin 42 above the sleeve 40. As the sleeve 40 moves upwardly, it contacts the pin on limit stop 39 and thereby raises the tow pin 42. When the tow pin 42 is raised manually, the sleeve 40 is supported by the upper edge of support structure 38, both of which remain stationary with respect to the tow pin 42.

A cage 44 is provided at the upper end of tow pin 42. Cage 44 is connected to a crossbar 48 by means of a flexible chain 46. The ends of crossbar 48 are supported by the vertical members 16 and 18.

One end of a cable 50 is connected to the other leg of the bellcrank 36. The cable 50 extends through suitable guides on the lower surface on base 12 towards the rear of the base. The other end of cable 50 is connected to a latch 52 pivotable about a horizontal axis corresponding to the longitudinal axis of pin 54. The longitudinal axis of pin 54 is transverse with respect to the base 12 and therefore is parallel to the bumper 26. Latch 52 is biased to a vertical disposition by means of spring 56 and is provided with a blocking surface 58. See FIG. 4.

A rear bumper 60 is rotatably supported for rotation about the longitudinal axis of pin 62 at the rear of the truck 10 by means of rearwardly extending brackets 64 and 66. Bumper 60 is provided with a latch member 68 resting on the blocking surface 58. Bumper 60 is biased to its upright position shown in FIGS. 1 and 4 by means of spring 70. So long as latch 52 is in an upright position as shown in FIG. 3, bumper 60 cannot rotate in a clockwise direction in FIG. 3 due to contact between the latch member 68 and the blocking surface 58.

The truck 10 is adapted to be moved along a slot 74 in a reference surface such as floor 72. A chain or other drive mechanism may be provided to propel the truck 10 along the slot 74 with the wheels 14 riding on the floor 72. As illustrated in FIG. 3, a chain 76 is provided having a pushing link 78 at spaced points therealong for contact with the lower end of the tow pin 42.

The operation of the present invention is as follows:

Let it be assumed that the truck 10 is part of a tow truck system. The rear end of the truck in front of the truck 10 is designated in FIG. 3 by the numeral 90. The front end of the truck behind truck 10 in the system is designated by the numeral 80. The trucks 10, 80 and 90 are identical.

If the rear bumper 60 on truck 90 is vertically disposed as shown in FIG. 4, with its latch member 68 blocked by surface 58, bumper 60 will contact the front bumper 26 at a line corresponding to the axis of pin 28 or at the 3 o'clock position. Such contact will cause truck 10 to push truck 90.

When latch 52 has pivoted in a counterclockwise direction in FIG. 3 due to pulling on the cable 50, blocking surface 58 will be in a position so as to be out of contact with latch member 68. As a result thereof, contact between bumpers 26 and 60 will cause bumper 60 to rotate in a clockwise direction from the position shown in FIG. 4 to the position shown at the right end of FIG. 3. Such rotation of bumper 60 on truck 90 at the right end of FIG. 3 will be against the bias of the spring 70. In doing so, the contact between bumpers 26 and 60 will cause bumper 26 to rotate about the axis of pin 28.

When bumper 26 rotates about the axis of pin 28, link 34 is moved upwardly thereby causing sleeve 40 to raise the tow pin 42 a sufficient distance so as to be out of contact with the pushing link 78 on chain 76 but still disposed within the slot 74. At the same time, bellcrank 36 is rotated in a counterclockwise direction in FIG. 3 by means of the brackets 30 and 32 which rotate with the bumper 26. As the bellcrank 36 rotates, the cable 50 will pivot the latch 52 in a counterclockwise direction in FIG. 3. As a result thereof, the front bumper on truck 80 will contact the rear bumper 60 on truck 10 and will likewise accumulate.

Thus, it will be seen that the single bumper 26 may perform the function of an accumulation bumper or a pushing bumper. In the illustrated embodiment, accumulation is caused by raising the tow pin 42 out of contact with the chain 76. It will be appreciated by those skilled in the art that accumulation can be accomplished in a different manner which does not involve raising the tow pin but does involve disconnecting the vehicle from its drive mechanism.

The present invention may be embodied in other specific forms without departing from the spirit or essential attributes thereof.

I claim:

1. A vehicle comprising a wheeled base, a movable rear bumper at the rear end of the base, a single bumper means at the front of said base for alternatively causing accumulation of the base and for pushing of other vehicles, said bumper means including a curved surface extending transversely of the front end of the base and mounted for rotation about a horizontally eccentric axis at the 3 o'clock position.

2. A vehicle in accordance with Claim 1 including an upright tow pin at the front end of the base, said single bumper means being coupled to said tow pin for raising the tow pin to effect accumulation of the base.

3. A vehicle in accordance with Claim 1 including a bellcrank supported by said base, one leg of the bellcrank being coupled to said curved surface, the other leg of the bellcrank being coupled to said rear bumper.

4. A vehicle in accordance with Claim 1 wherein said rear bumper is biased to an upright position, means providing a blocking surface for preventing rotation of the rear bumper against said bias, and said single bumper means being coupled to said blocking means for selectively removing the blocking means.

5. A vehicle comprising a wheeled base, a tow pin disposed in an upright position centrally adjacent the front of the base, a movable rear bumper having a pushing position and an accumulation position, means biasing said bumper to one of said positions, blocking means for preventing said rear bumper from moving from said one position to its other position, and movably supported single bumper means at the front of said base for alternatively causing accumulation of the base and pushing other vehicles in front of the base, said single bumper means being coupled to said tow pin to move the tow pin when the bumper means moves, said single bumper means being coupled to said rear bumper to remove the blocking means when the single bumper means moves, said single bumper means including a cylinder extending transversely at the front of the base, said cylinder being supported for rotation about a horizontal transverse axis at the 3 o'clock position within its contour and parallel to its longitudinal axis.

6. A vehicle in accordance with Claim 5 wherein said rear bumper is biased to an upright position corresponding to its pushing position, said rear bumper being pivotably mounted for movement from its pushing position to its accumulation position, said rear bumper having its upper edge positioned so as to move toward the front of the vehicle when the rear bumper moves from its pushing position to its accumulation position.

7. A vehicle comprising a wheeled base, an upright tow pin at the front end of the base, said tow pin being projectable to a position where its lower end is lower than the wheels on the base so that the lower end of the tow pin may enter a slot, a bumper means at the front of said base for raising the tow pin to effect accumulation of the base, said bumper means including a cylinder extending transversely at the front end of the base and mounted for rotation about a horizontal axis parallel to the longitudinal axis of said cylinder, the axis of rotation of said cylinder being at approximately the 3 o'clock position, and said bumper means including linkage extending from said cylinder to said tow pin to raise the tow pin upon rotation of said cylinder about said axis of rotation.

8. A vehicle comprising a wheeled base, a bumper supported at a front end of said base, said bumper including a curved surface mounted for rotation about a horizontally disposed eccentric axis, said eccentric axis being at approximately the 3 o'clock position, the axis of curvature of said surface and said eccentric axis lying in a horizontal plane.